Jan. 23, 1923. 1,443,101

J. B. STRAUSS.
LUBRICATING DEVICE.
FILED OCT. 8, 1919.

Inventor
Joseph B. Strauss
By Parker & Barton Attys

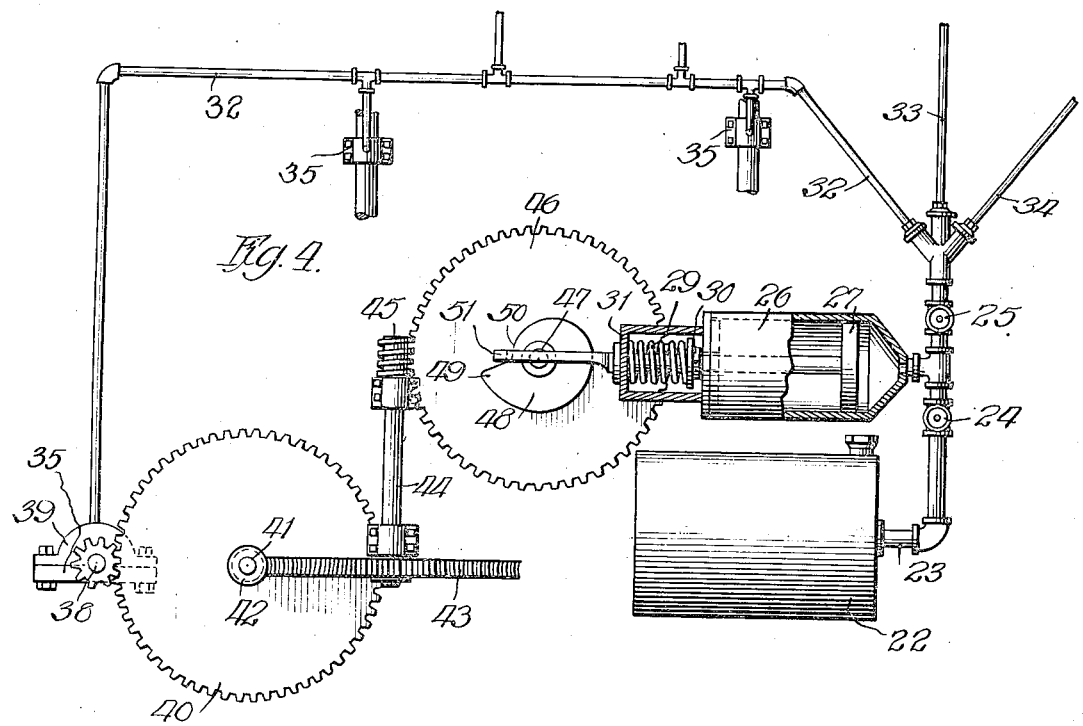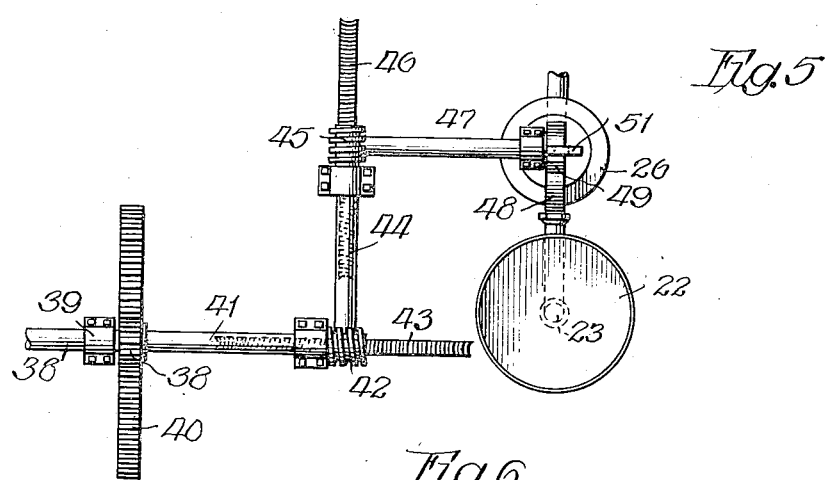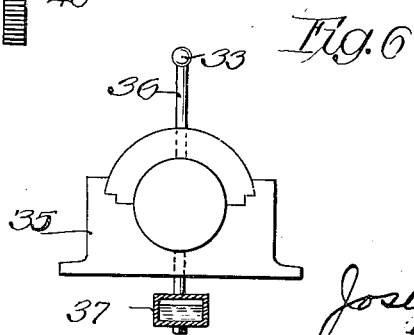

Patented Jan. 23, 1923.

1,443,101

UNITED STATES PATENT OFFICE.

JOSEPH B. STRAUSS, OF CHICAGO, ILLINOIS.

LUBRICATING DEVICE.

Application filed October 8, 1919. Serial No. 329,224.

*To all whom it may concern:*

Be it known that I, JOSEPH B. STRAUSS, a citizen of the United States, residing at Chicago, in the county of Cook and State of Illinois, have invented a certain new and useful Improvement in Lubricating Devices, of which the following is a specification.

This invention relates to oiling devices and has for its object to provide a new and improved device of this description. Mechanical devices where movable parts are provided require oiling, and it is found that when this is left to the operator, the oiling is not properly done and the parts therefore become unnecessarily worn, do not properly operate, and must be soon renewed. One of the objects of my invention is to provide a self oiling device for such moving parts which will insure their being properly oiled. The invention has other objects which are more specifically described in the following description. Referring now to the accompanying drawings Fig. 1 is a view showing a bascule bridge embodying the invention;

Fig. 4 is a view showing the invention applied to an automobile or other motor vehicle;

Fig. 5 is a view of the device of Fig. 4 taken from the line 5—5;

Fig. 6 is a view showing one of the bearings with its oil connections;

Like numerals refer to like parts throughout the several figures.

Figure 1:
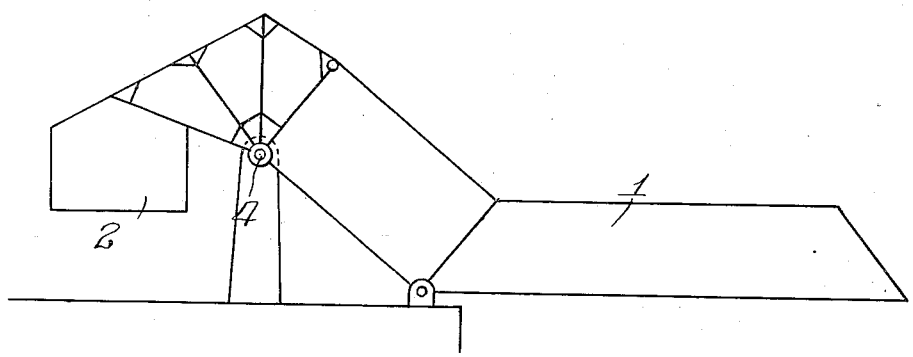
Figure 2:
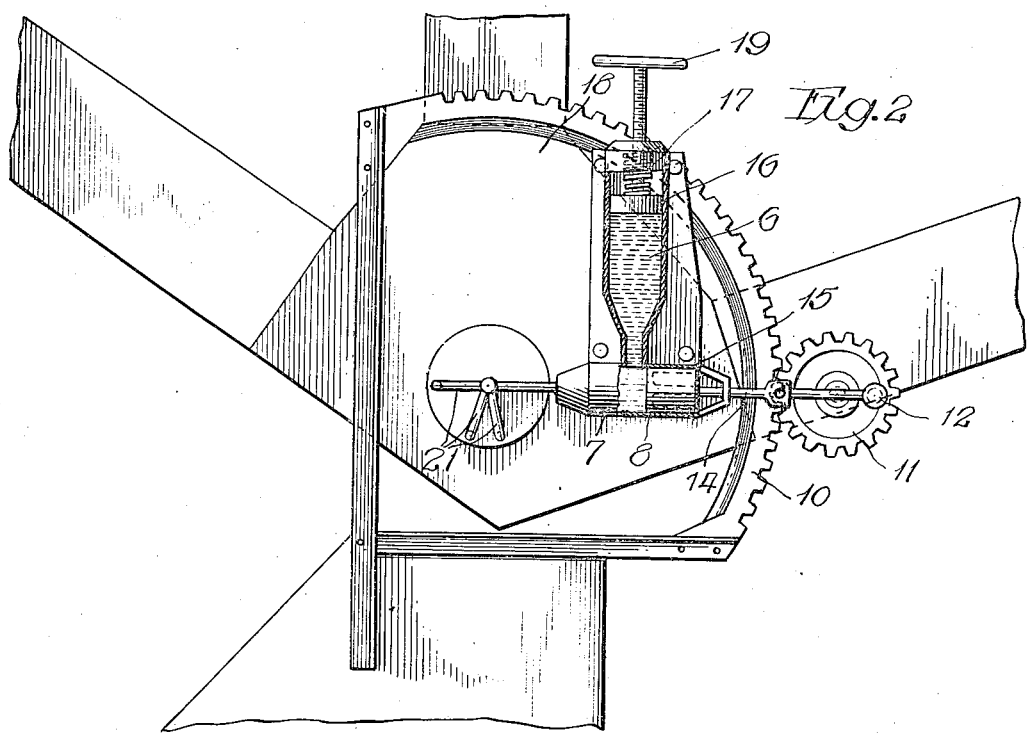
Fig. 2 is an enlarged view showing the trunnions and oiling apparatus.
Figure 3:
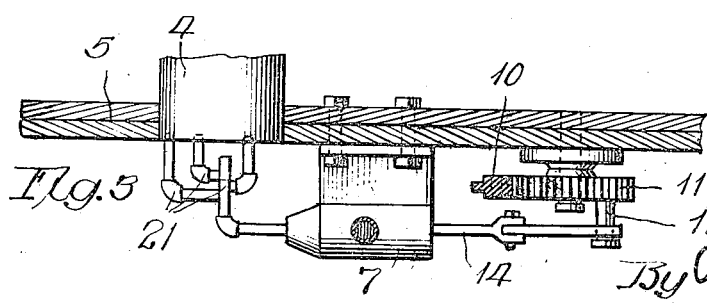
Fig. 3 is a sectional view taken on line 3—3 of Fig. 2.

Referring now to Figs. 1 to 3 I have illustrated a bascule bridge having a suitable main span 1, and a counterweight 2, having a counterweight frame 3, said latter frame mounted upon suitable bearings or trunnions 4. When the bridge is opened there is relative movement between the shaft or trunnion 4 and the bearing 5 and it is necessary to lubricate the surfaces of the trunnion and the bearing at these points.

I have illustrated one means for performing this function as the bridge is opened and closed. In this construction there is a grease reservoir 6 containing the grease to be used. When the device is used with bascule bridges the grease is preferably a non flowing grease. This reservoir connects with a cylinder 7 of a suitable pump. Within this cylinder is a piston 8 connected with some suitable driving mechanism so that it will be operated by the movement of the bridge.

In the particular construction shown there is a fixed part 9 carrying a rack 10. This rack has teeth which engage the pinions 11 so as to rotate the same. This pinion is provided with a crank pin 12 which is connected by a link 13 with the rod 14 of the piston 8. The relation of the parts are preferably such that the pinion will make one revolution for each operation of the bridge. The piston 8 is preferably provided with a rearwardly projecting part 15 which closes the connection between the oil reservoir and the solution when the piston has been moved forward thus preventing the grease from dropping down behind the piston. The oil reservoir is provided with a piston 16 normally pressed downward by a spring 17 which insures the movement of the grease from the reservoir to the cylinder 7. A threaded rod 18 provided with a hand wheel 19 is also used to force the piston down in the event the device is not working properly. This rod is separate from the piston but engages it when screwed down so as to force the piston downward and thus force the lubricant into the cylinder. If the piston 8 is not moving the continued forcing of this lubricant by hand into the cylinder 7 will force it into the feed pipes and to the bearing surfaces. This construction provides a means for oiling by hand in case anything goes wrong with the self oiling apparatus. The cylinder 7 is connected by a pipe 20 with a series of branch feeding pipes 21 which directly lubricate to the proper points. It will thus be seen that when the bridge is operated the piston 7 is moved forward to force the grease into the feed pipes and to the bearing surfaces, and hence it will be seen that oiling of these surfaces is at all times insured, the bearings being self oiling and the amount of lubricant being controlled by the movement of the parts which make the oiling necessary.

In Figs. 4, 5 and 6 I have illustrated a construction for oiling the bearings of an automobile or other motor vehicle. In such an oiling system it is customary to use a thin or self flowing oil. In this construction there is an oil reservoir 22. A pipe 23 connects with this oil reservoir and is provided with check valves 24 and 25. The pipe between these check valves is connected with the cylinder 26 of an oil pump. This cylinder is provided with a piston 27. Connected with the piston rod 28 is a spring or other actuating device for the piston. When a spring is used one end thereof engages a stop 30 on the piston rod, the other end engaging a stop 31 fixed against movement in any desired manner as by being connected with the cylinder. The check valve 24 is arranged to open, and the check valve 25 to close when the piston 27 is moved outwardly, while the check valve 25 opens and the check valve 24 closes when the piston 27 is moved inwardly. If the piston 27 is now moved outwardly it will draw oil in from the reservoir 23, the valve 24 opening and the valve 25 closing. The spring 29 is now pressed and if the piston is released this spring will move it inwardly and cause it to force the oil into pipe 23 between the valves 24 and 25. The pressure closes valve 24 and opens valve 25 so that the oil passes into the branch pipes 32, 33 and 34. These pipes run to the bearings 35 of the automobile or other apparatus by means of the pipes 36. These bearings may be supplied with waste oil reservoirs 37 so that any excess or waste lubricant may pass from the bearings into them. The oil pump is operated from the mechanism which is to be oiled.

In cases of high speed mechanism like automobiles it is desirable to have the oil injected in the bearings only at intervals so as not to provide too much oil. In the construction shown in Figs. 4 and 5 the oil pump is connected with the propeller shaft 38 which in turn is connected with the motor. Means is provided between this driving shaft and the pump to regulate the operation of the pump so that oil will only be injected in the bearings at intervals. This interval may be controlled as desired by the proper arrangement of the mechanism. In the construction shown I have provided a mechanism for a high speed automobile wherein the oil will be injected into the bearings by the pump intermittently at predetermined intervals, the automobile running a number of miles between each operation of the pump. In this construction the driving shaft 38 is connected by the gear 39 with the gear 40 on the shaft 41. The shaft 41 is provided with a worm 42 which engages a worm wheel 43 on the shaft 44. A worm wheel 45 on the shaft 44 meshes with a worm wheel 46 on a shaft 47. The shaft 47 carries a cam 48 having a high point 49, and a low point 50. The piston rod 28 of the pump has an engaging device 51 which engages the face of the cam. It will thus be seen that as the cam rotates the piston will be slowly drawn out so as to draw oil into the cylinder, and when the engaging piece 51 reaches the high point 49 of the cam, the engaging piece is released and the spring 29 causes the piston to be suddenly moved inwardly so as to force oil or lubricant through the pipes 32, 33 and 34, and hence into the bearings.

It will thus be seen that in this construction the oil is quickly forced into the bearings at the proper intervals so as to secure the automatic oiling of such bearings in the proper degree. If any surplus oil is injected in the bearings it passes into the waste oil reservoirs 37 and will not be spread out over the machine.

The worms and worm gears will preferably be enclosed in gear cases so that they may run in oil. I have shown the invention as applied to a bascule bridge and to a motor vehicle, but it is of course evident that it may be applied to various kinds of machinery which need oiling. It will thus be seen that by means of this construction the oil is automatically fed to the bearings at proper intervals when the machine is in operation, and ceases to be fed to them when the machine is not operating. This insures proper oiling of the bearings at all times, and prevents unnecessary wear thereof. It also greatly lengthens the life of the machinery and makes it unnecessary to oil it by hand. It also obviates the danger of the bearings having insufficient oil as is liable to be the case when hand oiling apparatus is used.

If for any reason it is desired to actuate the pump by hand it is only necessary to grasp the engaging piece 51 and rotate the piston and piston rod so as to free the engaging piece 51 from the cam, and then move it by hand. The engaging piece may again be connected with the cam by moving it back to its former position.

It will be noted that by this construction a series of bearings consisting of all or any part of the bearings of the device in connection with which the lubricating apparatus is used can be automatically lubricated.

I have described in detail a particular construction embodying the invention but it is of course evident that the parts may be varied in many particulars, without departing from the spirit of the invention as embodied in the claims hereto appended, and I therefore do not limit myself to the particular construction shown and described.

I claim:

1. A lubricating apparatus for bearings comprising a reservoir for the lubricant, a pump connected with said reservoir, a pipe connection between said pump and the bearing to be lubricated, said pipe connection discharging lubricant directly into the bearing, intermittently acting operating mechanism for said pump, a continuously acting driving connection between the operating mechanism for said pump and the apparatus, the bearing of which is to be lubricated which acts continuously while said apparatus is moving, whereby oil is automatically and intermittently injected into said bearing responsive to the movement of said apparatus.

2. A lubricating apparatus for bearings comprising a reservoir for the lubricant, a pump connected with said reservoir, a pipe connection between said pump and the bearing to be lubricated, said pipe connection discharging lubricant directly into the bearing, intermittently acting operating mechanism for said pump, a driving connection between the operating mechanism for said pump and the apparatus, the bearing of which is to be lubricated, whereby oil is automatically and intermittently injected into said bearing responsive to the movement of said apparatus, said bearing having a discharge passageway leading therefrom and a receptacle associated with the bearing and communicating with said passageway and adapted to catch whatever surplus lubricant may be injected therein.

3. A lubricating apparatus for bearings comprising a reservoir for the lubricant, a pump connected with said reservoir, a pipe connection between said pump and the bearing to be lubricated, said pipe connection discharging lubricant directly into the bearing, intermittently acting operating mechanism for said pump, a driving connection between the operating mechanism for said pump and the apparatus, the bearing of which is to be lubricated, whereby oil is automatically and intermittently injected into said bearing responsive to the movement of said apparatus, and means for operating said pump by hand independent of said driving mechanism.

4. A lubricating apparatus for bearings comprising a reservoir for the lubricant, a pump connected to said reservoir, a pipe connection between said pump and said bearing to be lubricated, said pipe connecting discharging lubricant directly into the bearing, operating mechanism for said pump actuated by the apparatus the bearing of which is to be lubricated, and means for controlling the operation of said pump so that the amount of lubricant discharged into the bearing is substantially equal to the amount required by the bearing, whereby a self oiling apparatus is provided.

5. A lubricating apparatus for bearings comprising a reservoir for the lubricant, a pump cylinder connected with said reservoir, a pipe connection leading from said cylinder to the bearing to be lubricated and discharge lubricant directly in said bearing, a piston for said pump, a gradual slow acting actuating part connected with said piston to gradually move it to the beginning of its operative stroke, a continuously acting driving connection between said slow acting mechanism and a moving part of the apparatus, the bearing of which is to be lubricated, a quick acting device for moving the piston during its operative stroke to force the lubricant into the bearing, and means for automatically bringing said quick acting device into operation at predetermined intervals.

6. A lubricating apparatus for bearings comprising a reservoir for the lubricant, a pump connected with said reservoir, pipe connections leading from said pump to the plurality of bearings to be lubricated and adapted to discharge lubricant directly into said bearings, intermittently acting operating mechanism for said pump, a driving connection between said intermittently acting operating mechanism and the apparatus, the bearings of which are to be lubricated, whereby oil is automatically and intermittently injected under pressure into said plurality of bearings responsive to the movement of said apparatus a discharge pipe connected with said bearing and receiving receptacles into which said pipes discharge.

In testimony whereof, I affix my signature in the presence of two witnesses this 27th day of September 1919.

JOSEPH B. STRAUSS.

Witnesses:
 EDNA B. PETERSON,
 MILDRED H. MACKE.